UNITED STATES PATENT OFFICE.

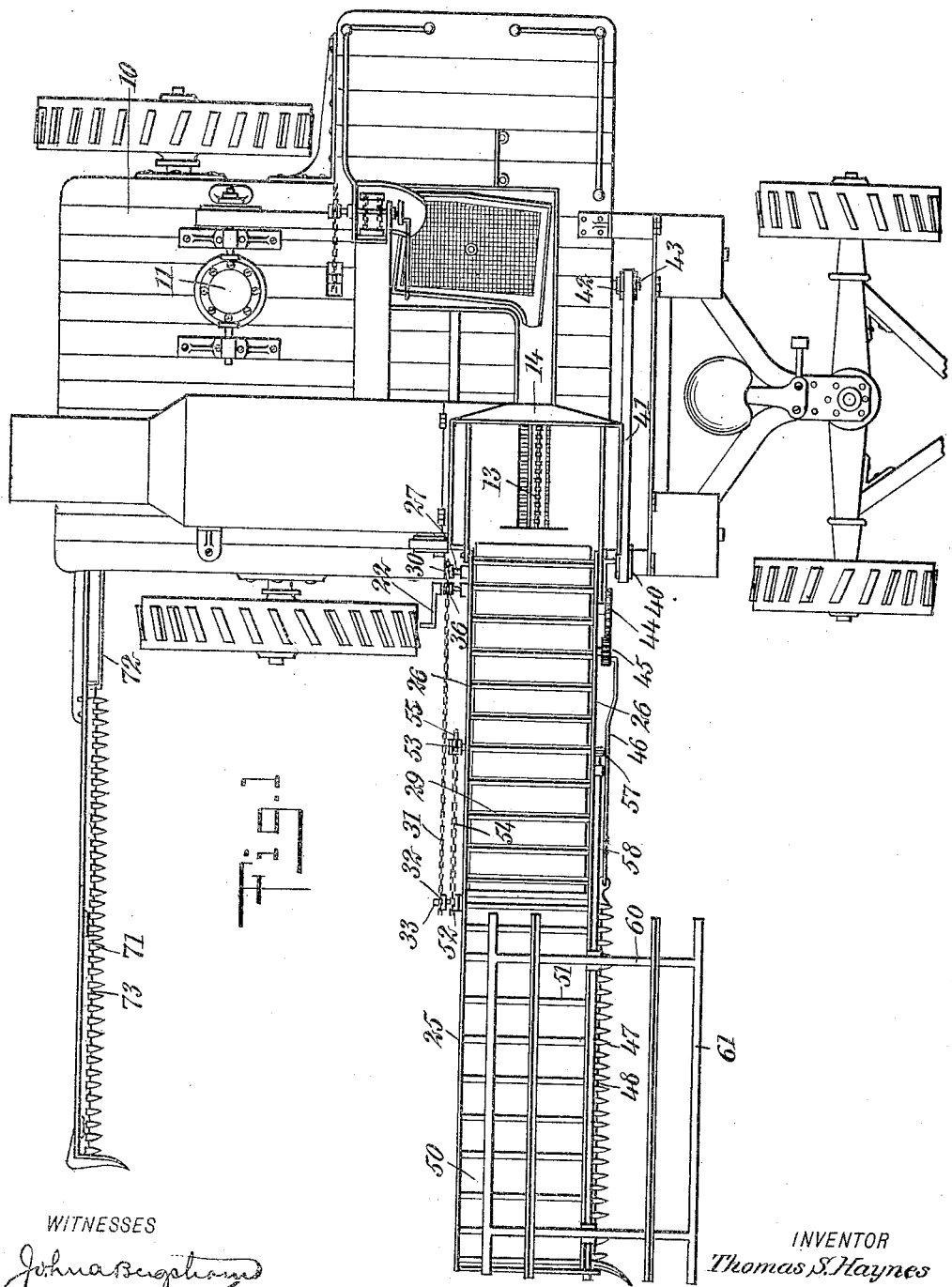

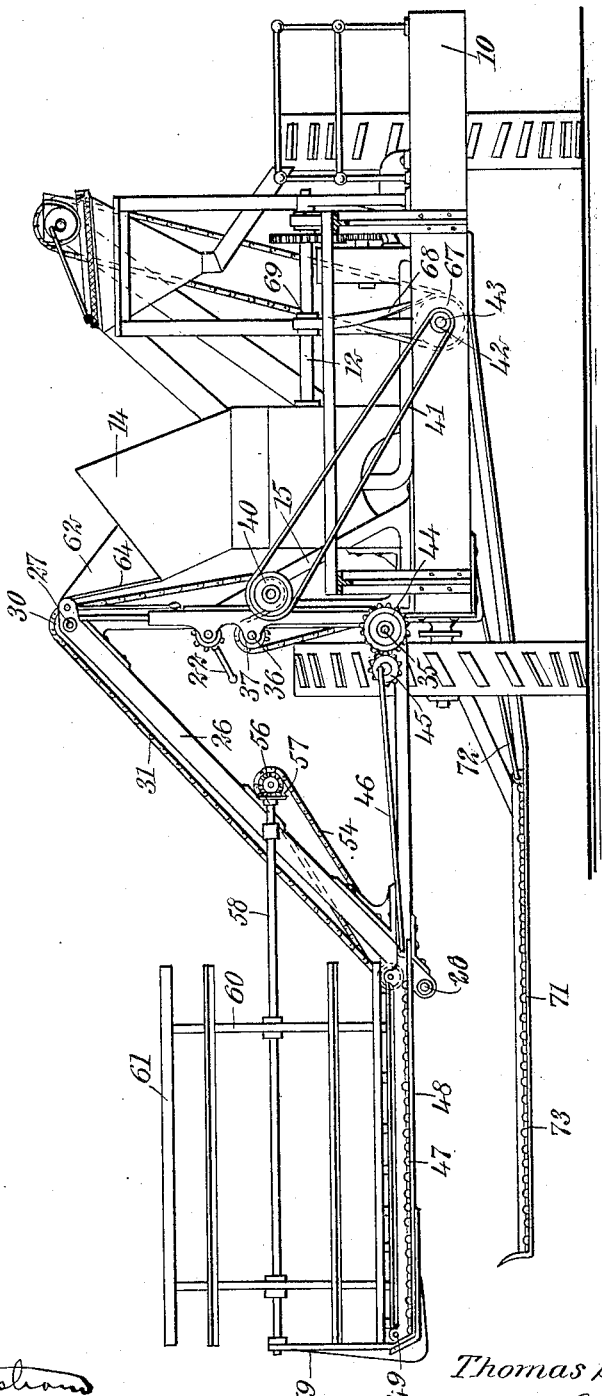

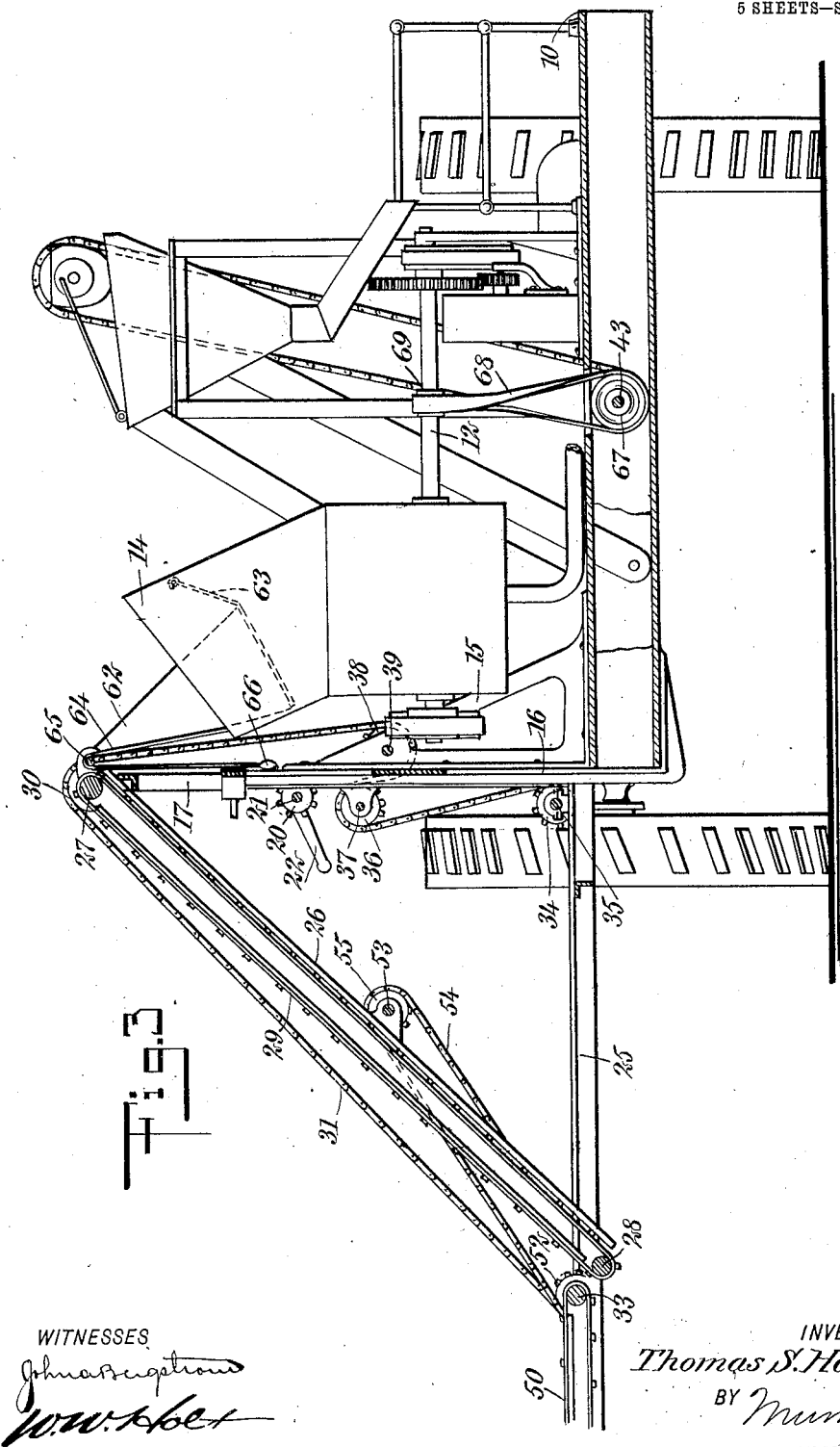

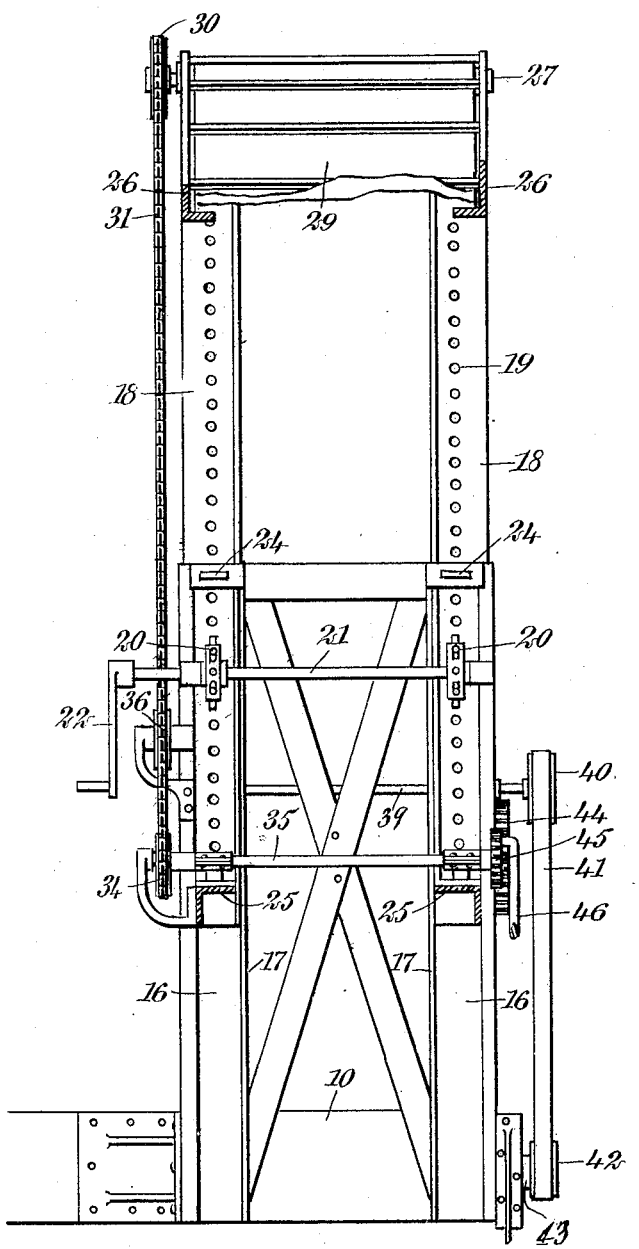

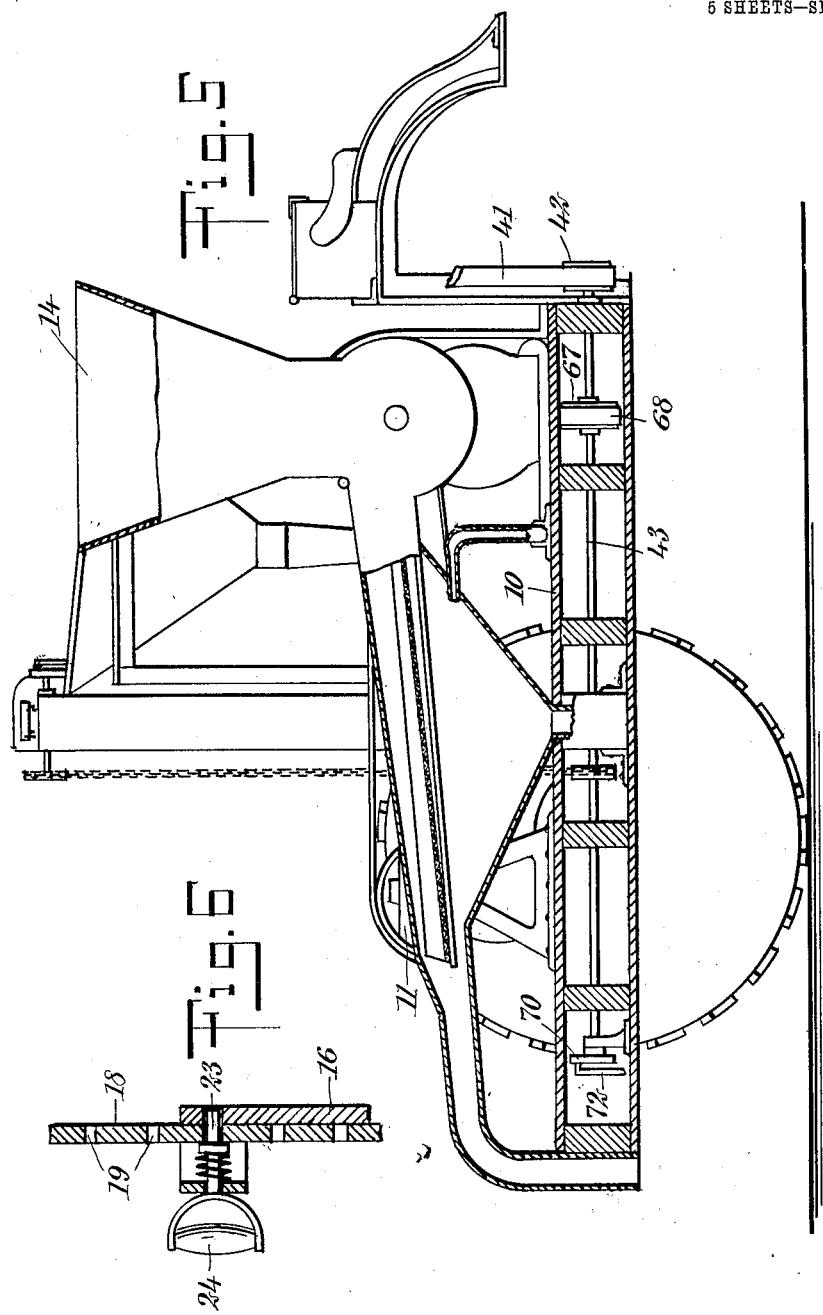

THOMAS S. HAYNES, OF BAY CITY, TEXAS.

THRESHING-MACHINE.

933,035.

Specification of Letters Patent.  Patented Aug. 31, 1909.

Original application filed April 25, 1906, Serial No. 313,582. Divided and this application filed March 25, 1908.
Serial No. 423,253.

*To all whom it may concern:*

Be it known that I, THOMAS S. HAYNES, a citizen of the United States, and a resident of Bay City, in the county of Matagorda and State of Texas, have invented a new and Improved Threshing-Machine, of which the following is a full, clear, and exact description.

This invention is an improvement in harvesters, the subject matter of which was divided from my co-pending application filed April 25, 1906, Serial Number 313,582.

The invention has in view a rigid frame arranged at one side of the harvester and adjustable to different elevations above the ground, the frame carrying the harvesting mechanism and braced intermediate its length by the frame of a downwardly and outwardly-inclined elevator.

Reference is to be had to the accompanying drawings forming a part of this specification, in which similar characters of reference indicate corresponding parts in all the views.

Figure 1 is a plan of the harvester in connection with my improved threshing machine; Fig. 2 is a front elevation of the same partly in section; Fig. 3 is a longitudinal section of the machine on an enlarged scale; Fig. 4 is an enlarged sectional elevation of the adjusting means for the elevator between the harvesting and threshing mechanisms; Fig. 5 is a cross section through the machine; and Fig. 6 is a fragmentary sectional view showing a locking device for the adjusting mechanism of the elevator between the harvesting and threshing mechanisms.

10 indicates a wheel-supported platform having the usual hitching devices at the front and on which at a convenient point is mounted a motor 11, preferably in the nature of an internal combustion engine, which drives a cross-shaft 12 mounted in bearings at the forward portion of the platform, and on which a threshing cylinder 13 is fixed, contained in a breast or concave having a feed hopper 14. Secured to the floor of the platform is a pair of triangular brackets 15, to the vertical faces of which are riveted or otherwise secured standards 16, said standards being flanged at their inner edges, as indicated at 17, and having the opposite edges bent over to form guideways for guide-bars 18 of the main apron frame. The guide-bars 18 are flanged on their opposite edges to give a good bearing surface between them and the flanges 17. They also have a series of alining equally-spaced holes 19 running their entire length, which act in the capacity of rack-bars for engaging pinwheels 20 which are fixed to a shaft 21 journaled on the standards 16, and adapted to be operated by a crank 22 attached at one side. At the upper end of each standard 16, as best shown in Fig. 6, a spring-pressed pin 23, operated by a handle 24, passes through a hole in the standard and one of the holes of the adjacent guide-bar 18, when the holes aline for locking the guides in adjusted position.

To the lower ends of the guide-bars 18 are secured horizontally-arranged angle-bars 25 which are connected intermediate their length to the upper ends of the guides by an angular frame or trough 26 at an inclination of about forty-five degrees. At each end of the trough are journaled rolls 27 and 28, respectively, over which passes an apron 29 preferably made of a canvas strip with attached wooden strips at intervals of its length to form an elevator to raise the unthreshed grain into the hopper 14. One of the journaled bearings of the roll 27 is extended to one side, to which a sprocket wheel 30 is fixed, driven by a chain 31 passing around a sprocket 32 on a shaft 33, as best shown in Fig. 1, then horizontally to and around a sprocket 34 on a shaft 35, then over an idly-mounted sprocket 36 on a shaft 37, then down to and around a sprocket 38 on a shaft 39, then back to the sprocket 30, this construction obviously permitting a raising and lowering of the entire frame without varying the tension on this chain. The shaft 39 is journaled in the upper ends of the triangular brackets 15 and has fixed to its opposite side from the sprocket 38, a pulley 40 driven by a belt 41 passing around a pulley 42 secured to the forward end of a shaft 43; this last mentioned shaft, as best shown in Fig. 5, is arranged longitudinally of the platform underneath its flooring.

The shaft 35 is journaled in bearings in the right-angle of the apron frame, and has fixed to its opposite side from the sprocket 34, a gear 44, as best shown in Fig. 2, in mesh with a gear 45 journaled at one side thereof, the latter driving through the intermediary of a link 46, a sickle-bar 47 which is slidable on a finger-bar 48 fastened at the outside of the adjacent angle-bar 25. At the outer ends of the angle-bars 25, a roll 49 is journaled, over which passes a canvas strip 50, with attached transverse cross-strips 51, forming a horizontal apron, passing over and driven by a roll forming a part of the shaft 33, as best shown in Fig. 3. On the shaft 33, adjacent to the sprocket 32 is also attached a sprocket 52. The sprocket 52 drives a shaft 53 by a chain 54 passing about a sprocket 55, the said shaft 53 being journaled in brackets fixed to the under side of the trough-frame 26, and carrying a miter gear 56 at its front end, meshing with a similar gear 57 fixed to a shaft 58 which is journaled in bearings respectively arranged at one side of the elevator, and at its outer end in a standard 59 projecting upwardly from the end of the finger-bar. Fixed to the shaft 58 just over the sickle-bar is a reel made up of radial arms 60 and attached longitudinal strips 61 at their outer ends, which coöperate with the sickle and finger bars in the usual manner, as in machines of this character.

To the upper end of the elevator are attached triangular guiding sheets 62, extending at opposite sides into the hopper 14 where their lower edges are each attached to a spring-arm 63 having a downward tension. A third guiding-strip 64 is attached to the rear edge of the hopper, and after passing over a roller 65 at the top of the elevator, is provided with a weight 66 at its lower end for keeping it under tension. This manner of connecting the elevator with the hopper, at all times keeps the guiding-sheets stretched out when the height of the elevator is adjusted by the operation of the crank 22. The action of this crank, when the handles 24 of the spring-pressed pins 23 are withdrawn, is to cause the reel, apron, elevator and all attached parts to move in a vertical direction. After this adjustment has been carried out to bring the cutter formed by the sickle and finger-bars to the required height, the cutting and delivering mechanisms are again locked in position by the spring-pressed pins 23.

Directly under the cross-shaft 12 is fixed to the shaft 43, a pulley 67, which is connected by a belt 68 passing over a pulley 69 carried by the shaft 12. Also fixed to the shaft 43 at its rear end is a disk 70 which drives a sickle-bar 71 through the intermediary of a connecting link 72. The sickle-bar 71 is slidable on a finger-bar 73 which is rigidly secured at a suitable elevation near the rear end of the machine.

In the operation of the machine, as the wheeled platform is drawn over the ground the motor is set in operation, causing the sickle-bars, reel, apron and elevator to be set in motion; the reel operating to gather in the grain and force it against the forward cutter where it is severed and thence thrown on the apron, which latter transports it to the elevator where it is carried above and discharged into the feed hopper of the threshing mechanism. Directly after the grain has been removed the rear cutter severs the stubble a slight distance above the ground.

Having thus described my invention, I claim as new and desire to secure by Letters Patent:

1. In a harvesting machine, the combination of a wheeled support, an elevator having a frame, a conveyer discharging on the elevator, means for cutting the grain and discharging it on the conveyer, and a rigid frame on which the elevator, conveyer and the cutting means are carried, vertically slidable at one side of the support and braced intermediate its length by the elevator frame.

2. In a harvesting machine, the combination of a wheeled support, standards rigidly secured at one side of the support, guide-bars adjustable on the standards, angle-bars rigid with the lower ends of the guide-bars extending outwardly therefrom, inclined angle-bars connecting the upper ends of the standards with an intermediate portion of the first mentioned angle-bars, an inclined movable apron between the inclined angle-bars, a second movable apron between the outer ends of the first mentioned angle-bars discharging on the inclined apron, and means for cutting the grain and discharging it on the second apron.

In testimony whereof I have signed my name to this specification in the presence of two subscribing witnesses.

THOMAS S. HAYNES.

Witnesses:
 JOHN M. CORBETT,
 ORIEN A. GROVER.